United States Patent Office 3,265,351
Patented August 9, 1966

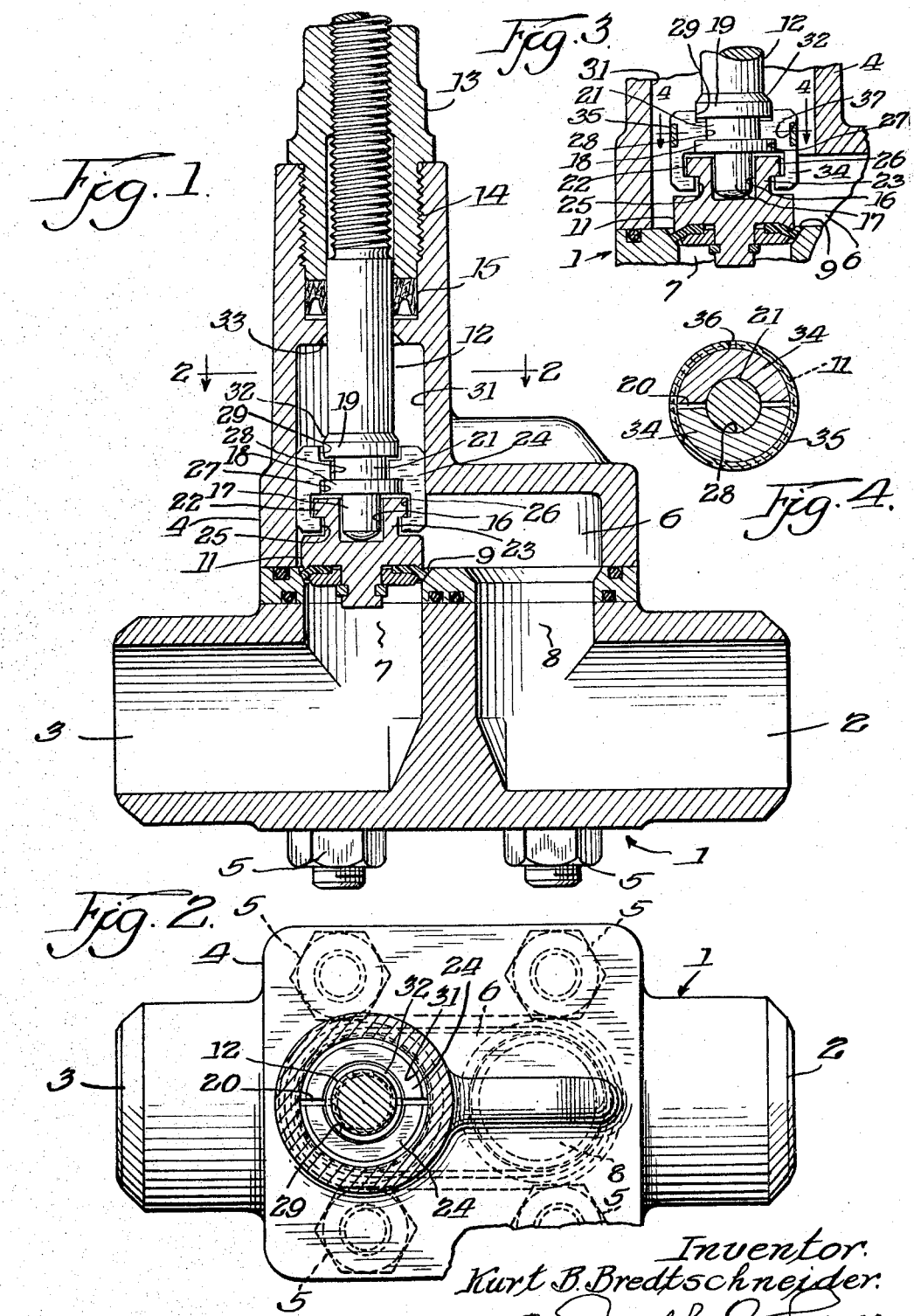

3,265,351
SEGMENTAL DISC STEM CONNECTION
FOR VALVES
Kurt B. Bredtschneider, Chicago, Ill., assignor to
Crane Co., Chicago, Ill., a corporation of Illinois
Filed Dec. 20, 1963, Ser. No. 332,007
6 Claims. (Cl. 251—88)

This invention relates generally to a valve construction, and, more particularly, it is concerned with a novel segmental disc-stem connection for valves and the like.

Heretofore, one of the problems confronting valve designers and manufacturers has been to meet the requirement of many organizations, such as the United States Navy, for example, that the usual stem-disc connecting means employed, such as screw threads, be eliminated where necessary. This structural rejection is based upon the fact that in many installations involving unusually severe service, the disc-stem ring threaded connection between the stem and the valve closure member is not considered to be sufficiently sturdy and durable for the severe services encountered. In addition, of course, there is the fact that vibration in a pipe line may seriously interfere with the security of the joint effected by the threads and there have been many instances where actual separation has taken place between the stem and closure member because of the failure of the threads to function properly, thus making the valve in such cases inoperative.

Therefore, it is one of the more important objects of this invention to provide for a valve construction specifically directed to a disc-stem connection in which such objections are overcome and in addition it provides for the connection being conveniently and economically made in the field if and when inspection indicates that such adjustment or replacement is desirable.

In some cases in the past in those installations in which the valves are installed in the piping with the line fluid pressure above the valve closure member, the valve opening force is transmitted from the valve stem to the closure member with an unusually high specific load. This condition causes the connections to wear out prematurely and eventually results in a poor connection and a need for prompt replacement. Also in such cases, the removal of the connecting means such as lock-welds, balls, or pins, is relatively difficult and poses a severe problem in the field where special tools or equipment are not ordinarily available.

Therefore, one of the more important objects of this invention is to avoid these difficulties, and, as will hereinafter become apparent, such object is attained with a sturdy construction capable of quick assembly and disassembly whenever necessary.

Other objects and advantages will become more readily apparent upon proceeding with the specification, read in light of the accompanying drawings, in which:

FIG. 1 is a fragmentary sectional assembly view of a valve embodying one form of my invention;

FIG. 2 is a transverse sectional view taken on the line 2—2 of FIG. 1;

FIG. 3 is a fragmentary sectional view of a modified form of the invention; and

FIG. 4 is a transverse sectional view taken on the line 4—4 of FIG. 3.

Similar reference numerals refer to similar parts throughout the several views.

Referring now to FIG. 1, a globe valve is shown having a casing 1 with the usual end connections 2 and 3 for attachment to a pipe line (not shown) and having attached thereto a bonnet 4 attached by means of the bolt studs 5, the said bonnet having the chamber 6 communicating with the respective ports 7 and 8 of the valve casing 1. At the upper portion of the port 1, a valve seat is defined as at 9 and to which the closure member 11 reciprocally movable in relation thereto makes suitable contact in opening and closing the valve in the usual manner. A threaded valve stem 12 actuates the reciprocally movable closure member and is journalled threadedly in a stem bushing or centerpiece 13 as shown. The latter is threadedly or otherwise attached in leakproof relation to the bonnet 4 by means of the threads 14. Preferably for sealing purposes, a stuffing box 15 provides the usual fluid tight seal around the valve stem in its normal arrangement.

The important aspect of this invention lies in the manner in which the attachment is made between the valve closure member 11 and the valve stem 12. Such connection must obviously be durable, must be corrosive resistant, or minimize corrosion tendencies. It must be simple to assemble and economical if replacements and original installations are to be practical. In this connection, the avoidance of relatively complex machinery to manufacture or produce the device is important, as, for example, avoiding the use of milling machines and instead being able to employ the beneficial high production screw machine operations.

With the foregoing in mind, attention is now specifically directed to the unusual manner in which the connection between the stem 12 and the closure member 11 is accomplished. It will be noted that said closure member is provided at an upper portion thereof with a recess of relatively reduced proportions designated 16 within which the similarly reduced portion 17 of the stem is received to permit of a swiveling connection between the stem and the closure member. Immediately above and in spaced-apart relation thereon, a plurality of collar portions designated 18 and 19 respectively are provided, being connected by a reduced or neck portion designated 21.

It will be noted that the upper portion of the closure member is provided with a thickened annular portion 22 having a reduced neck 23 connecting the thickened portion 22 to the main body of the closure member 11.

Substantially enclosing all of the elements thus far described on the closure member 11 and the stem 12, a plurality of segments 24, in this case two, are oppositely disposed and are provided with recessed portions coinciding with annular portions 23 and 22 of the closure member 11 and with similar recesses 27, 28, and 29 for the collar portion 18, the neck portion 21 and the collar portion 19 respectively of the stem 12.

It will be noted that preferably, although not necessarily, slight annular clearances are provided between the respective collar portions and the reduced neck portions of the stem and closure member. It is to be understood that such clearances dimension-wise will depend largely upon the nature of the service encountered in the field.

It will be appreciated that means must be provided to retain the said connector segments 24 around the closure member and stem portions designated, and this can be conveniently done by making the inside surface 31 of the valve bonnet, for example, as indicated, with a diameter sufficient to receive relatively snugly the outside diameter of the assembled connector segments 24. In this way, the said segments are securely retained in position around the valve closure member and stem during the operation of the valve and regardless of whether it is in open, closed, or throttled position.

The upper portion of the stem collar 19 is preferably provided with an annular inclined surface 32 for purpose of engaging the bonnet inclined surface 33 when the valve is in the wide open position in order to permit packing of the stuffing box as indicated at 15 under fluid pressure when and if the latter packing is necessary.

It will be appreciated that as to the manner in which the said segments are provided a number of methods are available, as, for example, the segments may be made initially integral and then suitably cut transversely to provide the saw-cut clearance 20 more clearly shown in FIG. 2 which serves the important function of providing for line fluid drainage between the segment parts. Thus, said clearance between the two connector segments prevents fluid being trapped in the bonnet chamber and between the segments.

In the description of FIGS. 1 and 2, mention has been made as to the manner in which the connector segments are retained in assembled relation around the stem and closure member. Another means of accomplishing such retention is shown more clearly in the modification illustrated in FIG. 3, in which the closure member 11 is not guided in the bonnet bore 31, but instead the connector segments 34 are held or retained to the closure member and the stem by means of a split spring ring 35, split as indicated at 36 (FIG. 4) and retained within the circumferential groove 37 as shown. Thus, in this case, the line fluid in addition to the flow around the assembly of the segments and closure member as measured by the chamber 6 may also flow within the bonnet chamber defined by the surface 31.

In describing FIGS. 1 and 2, mention was made that clearances between the respective collar portions between the stem and the recesses provided by the segments may be employed and selectively applied, depending upon the nature of the service involved. In the instant modification shown in FIG. 3, it is preferable that the collar portions at 21, 19 and 18 are relatively snugly received within the respective recesses at 27, 28 and 29 provided by the segments in order to relieve or minimize such strains or forces outwardly by the segments as might otherwise be exercised upon the spring ring 35.

It will be understood that while several forms have been shown embodying my invention, it is broadly capable of accommodating other forms falling within the spirit of the contribution, the forms shown being only for purposes of illustration, not of limitation.

Therefore, what I desire to obtain by Letters Patent is set forth in the appended claims.

I claim:
1. In a valve construction, the combination of a valve seat and a reciprocally movable swivelable closure member therefor engageable with said valve seat, a valve stem with an end portion thereof in telescoped relation to a hollow walled portion of said closure member, means for connecting said stem in rotatable and axially limited relation to said closure member, the said stem having a plurality of spaced apart collar portions at an end portion thereof adjacent said telescoped portion of the stem, the said stem connecting means comprising a plurality of annularly disposed connector segments, the said segments having recessed portions therein formed to receive portions of said stem collar portions, the said closure member at an upper portion thereof having an annularly thickened portion connected to the closure member by a reduced neck portion, the latter neck portion being engaged by said connector segments, and means to retain said segments to said closure member and stem.

2. The subject matter of claim 1, said means to retain said segments to said closure member and stem comprising a valve bonnet and casing, the bonnet having means enclosing the outer periphery of said segments in relatively close relation.

3. The subject matter of claim 1, the said stem having a reduced end portion snugly engaged by the said closure member.

4. The subject matter of claim 1, said means to retain said segments to said closure member and stem comprising a split spring ring mounted on said segments.

5. The subject matter of claim 4, the recessed portions of said segments providing snug fits between said stem and segments.

6. The subject matter of claim 1, the segments being spaced apart to permit line fluid drainage past said segments.

References Cited by the Examiner
UNITED STATES PATENTS

| | | | |
|---|---|---|---|
| 310,870 | 1/1885 | Blessing | 287—107 X |
| 3,204,922 | 9/1965 | McInerney | 251—88 |

M. CARY NELSON, *Primary Examiner.*

R. C. MILLER, *Examiner.*